United States Patent [19]
Toll

[11] 3,790,052
[45] Feb. 5, 1974

[54] CUTTING TOOL
[76] Inventor: Louis Robert Toll, 930 N.W. 27th Ave., Miami, Fla. 33125
[22] Filed: Feb. 8, 1972
[21] Appl. No.: 224,430

[52] U.S. Cl............... 225/2, 225/96.5, 30/164.9
[51] Int. Cl............................ B26b 3/08, B26f 3/00
[58] Field of Search .. 30/164.9, 286, 294, 287, 293; 7/14.1 R; 225/96.5, 2; 81/5.1 A

[56] References Cited
UNITED STATES PATENTS
526,444   9/1894   Heysinger ........................ 225/96.5
2,557,699  6/1951  Silver ............................. 30/293 UX
2,853,907  9/1958  Bakke ............................. 81/5.1 A FOREIGN PATENTS OR APPLICATIONS
776,369  1/1968  Canada ................................ 30/293
180,896  2/1936  Switzerland ......................... 30/293

Primary Examiner—Harold D. Whitehead

[57] ABSTRACT
A plastic-cutter tool for cutting mica, the invention being both a cutting tool and the process of use thereof, the cutting tool having a butt jaw end with a slot thereabove and a downwardly held cutting needle, the process including the placing of the butt jaw-end of the tool against the table edge, scoring the mica by lateral movement to and fro several times, then snapping downwardly by applying pressure to the scribed strip-edge in order to snap off the scored edge. An opposite end of the cutting tool includes a downwardly extending projection angled slightly rearwardly having mounted therein extending coaxially with the downwardly extending projection a cutting needle utilizable for cutting mica, cutting plastic, or cutting irregular cuts and holes, the use for cutting mica being by use of a straight edge, scoring the back side of the mica several times and pressing downwardly with the thumb at the cuts with the other hand snapping the mica upwardly, while when cutting plastic the same procedure is followed except snapping downwardly, while using a pattern or a hole tablet to produce irregular cuts and/or holes by scoring several times then pushing from the face to the back of the scored material.

6 Claims, 5 Drawing Figures

CUTTING TOOL

This invention relates to a cutting tool for the cutting of mica, plastics and the like.

BACKGROUND OF THE INVENTION

Prior to this invention there have been various tools for the cutting of plastics, and sometimes for the scribing of hard surfaced materials. However, prior to this invention there have not been any fully suitable small tools for in a simple manner the cutting of mica, particularly where the instrument can be used for a plurality of purposes such as also the cutting of plastics, irregular holes, as well as having a choice of the manner in which the mica is cut.

SUMMARY OF THE INVENTION

Accordingly, it is an object of this invention to overcome problems and difficulties of the type discussed above.

Another object is to obtain a small tool of simple structure suitable for accurate and clean cutting of mica along an edge of a surface such as a table edge on which a mica surface is being mounted, for example.

Another object is a process of cutting such a surface with an instrument of the type of this invention.

Another object is for a different situation where an edge of table or the like is not necessarily involved, to obtain an instrument suitable also for the cutting of mica in the absence of a table edge as well as for the cutting of mica or plastic, particularly in view of the need for different procedures in the cutting of mica as compared to plastic.

Another object is to obtain a tool or instrument concurrently suitable for the cutting of irregular cuts and/or holes.

Another object is to obtain a tool having a plurality of interrelated and correlated uses in the working of mica and/or plastic flat faced materials.

Other objects become apparent from the preceding and following disclosure.

One or more of the preceding objects are obtained by the invention as described hereafter.

The invention broadly is a cutting tool and the process of use thereof, where the cutting tool is an elongated member having a head which defines a slot extending from its terminal head end backward toward the handle forming a substantially flat slot with an abutment at the back thereof against which the edge of the table is abuttable by sliding the instrument such that the edge of the workpiece such as mica-sheet edge slides into the slot, with a downwardly extending removably mounted needle extending downwardly through an upper projection of the head at a point whereby the downwardly extending needle is substantially aligned with the end of a lower head abuttment which normally would abut a table edge whereby the downwardly pointing needle scores and cuts the upper surface of the mica at a point flush with the table being abutted by the lower abutting head projection after the scoring of the upper surface by lateral to and fro movement of the abutting head, downward pressure on the scribed strip-edge to snap off the mica strip. Extending further rearward of the handle and angled downwardly and rearwardly is a rearward projection having within the rearward projection terminal end an aperture axial of the rearward downwardly directed projection receivable of a pin removably mountable, the rear pin by reversing the instrument in the hand being utilizable for the cutting of mica when a table edge is not available nor desired, by the use of the straight edge, scoring the back side of the mica about five or six times about one-half way through the mica, and pressing down with the thumb at the cut while with the other hand snapping the portion of the mica beyond the scored edge upwardly; on the other hand for the cutting of plastic, the same procedure is followed except cutting downwardly. For the cutting of irregular cuts and holes, the rearward pin is employed using a pattern or a hole template, scoring eight to ten times such that the pin makes its way about three-fourths of the way through the material being scored, then pushing from the face toward the backside of the material being scored in order to snap out the scored section. The back projection is sharpened by inverting the tool and dragging the pin along sand paper, a file, or concrete to bevel the back side of the pin.

THE FIGURES

DETAILED DESCRIPTION OF THE INVENTION

This invention results in an amazing new tool for easy cutting of mica, ceiling plastic, sheet plastic, vinyl, tile and the like. It is possible that the shape of the instrument may vary considerably from one embodiment to another provided that the basic essentials of the construction of the instrument are present, namely a lower butting projection as a part of the head, and an upper overhanging head projection with a needle extending downwardly therefrom removably mounted therein such that the cutting point of the needle is closely adjacent to and aligned with the abutting end of the lower head projection. However, it is noteworthy that the preferred embodiment illustrated in FIGS. 1 through 5 does present a special and valuable high degree of utility because of the strength of a cutting tool of this particular design together with the easy handling and manipulations thereof and achieving of the desired cutting effects therewith, facilitated as a part of the cutting function the ready availability of the additional cutting end at the rear downwardly extending projection.

Figure 2:
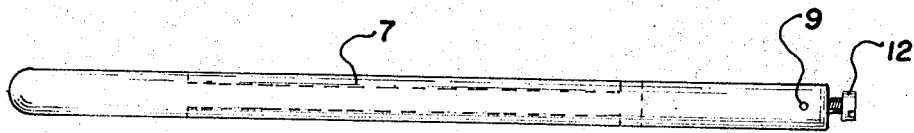
FIG. 2 illustrates an elevation plan view of the cutter tool of this invention as illustrated in FIG. 1, taken along lines 2—2 of FIG. 1.
Figure 1:
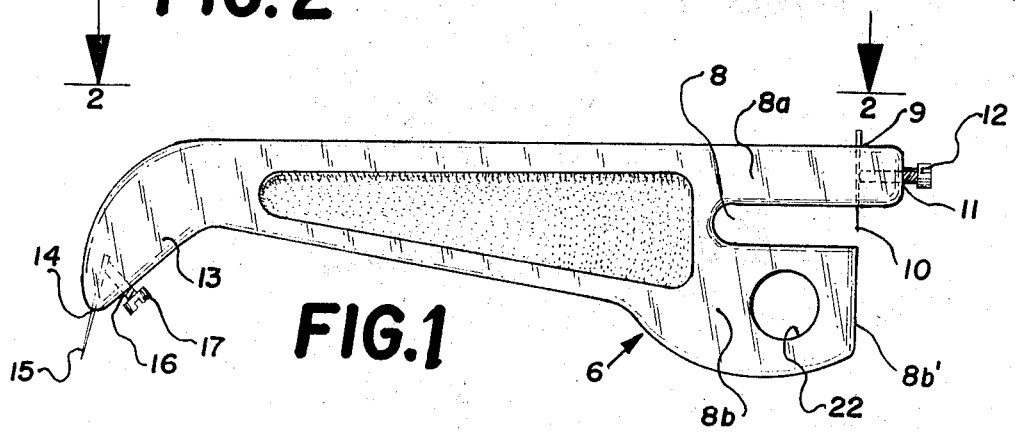
FIG. 1 illustrates an elevation side view of a preferred cutter tool of this invention

In greater detail, with reference to the figures, FIG. 1 illustrates the cutting tool 6 of a preferred embodiment of the invention, with an inner recessed surface 7 — shown in FIG. 2 on opposite sides of the cutting instrument circumscribed by thicker reinforcing handle members. It should be noted that the recessed portion together with having the strong peripheral thickened areas supporting the lower and upper portions of the head and the rearward pin-holding projection, the recessed area on each of opposite sides of the cutting instrument additionally provides a better opportunity for the operator to adequately grasp the cutting tool without the possibility of the cutting tool slipping and/or sliding and/or turning in the hand of the operator. The head of the cutting instrument includes a lower head projection 8b and an upper head projection 8a extending forwardly along the imaginary axis of the length of the cutting tool 6, the upper projection 8a and the lower projection 8b together with the rearward portions of the head defining an abutting slot 8 of a predetermined breadth and height of a design and shape typically as illustrated which design and shape provides typically sufficient room for the thickness of a mica or plastic slab to be inserted slidably thereinto — i.e., moving the instrument toward the edge of the plastic such that the edge becomes inserted into the slot until the flat end-face 8b' abuts the supporting side of the table beneath the plastic 18, with the needle 10 downwardly inserted through the aperture 9 and locked into position by screw 12 inserted into female threaded aperture 11 until the shaft of the screw 12 abuts and presses against the needle 10 which is within the channel of the aperture 9. At an opposite end of the cutting tool is the scribing portion utilizable together with the cutting head in a particular cutting operation or process for obtaining a unitary effect. The rearward projection 13 extending angularly downwardly and rearwardly has along its downward axis an aperture in channel 14 with a downwardly mounted needle 15 locked in position by a lock screw 17 screwed into female threaded channel and aperture 16. In a typical operation utilizing both the head and rearward scribing end of the instrument, initial scribing marks may be made on the surface of a slab of mica or plastic by utilization of a rule in the nature of the operation shown in FIG. 3 in which for example, rule 20 is held in position by the left hand of the operator while with the right hand the operator grasps the cutting tool 6 such that the scribing needle 15 presses against the supporting rule 20 preventing the needle from sliding backwardly while the backward pressure (withdrawing pressure) with a downward pressure during a to and fro movement of the cutting tool scribes the surface to be cut along the straight edge of the rule 20 lying on the slab substantially flat surface 18 following the beginning of the scribing the slab may be further moved out to overhand the end of the table with the abutting end of the instrument abutting the underside of the table when the needle 10 is aligned with the point being scribed, and a further scribing action completes the necessary scribing before the downward snapping motion of the cutting tool 6 in completing the snapping off of the scribed overlapping portion when working with mica or snapping upwardly as illustrated in FIG. 4 when working with plastic. Accordingly, the opposite ends of the instrument serve to obtain a unitary function and are a part of the overall combination for a particular operation, depending upon the particular job to be accomplished. The needle 10 depth is adjustable.

Figure 3:
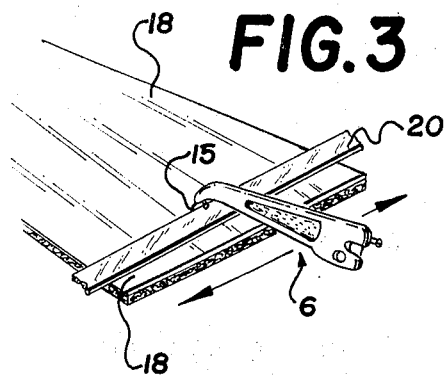
FIG. 3 illustrates the position and movement of the cutter tool of this invention in a perspective plan view in the utilization of the pin at the rear end of the cutter tool for scribing a back side of plastic or mica.
Figure 4:
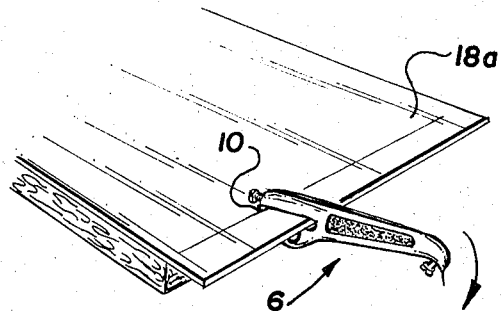
FIG. 4 illustrates in perspective view the utilization of the tool of this invention, utilizing the head of the invention to scribe and snap off a scribed portion of mica at a table edge.

In a conventional normal situation however, the scribing action illustrated in FIG. 3 is typical of scribing when scribing a portion of mica without the benefit of a table edge or when the scribing action is not associated with a table edge such as for example for imparting a scribing action for irregular cuts and/or holes for a particular pattern. In such instances as for example as illustrated in FIG. 3, normally the slab would be turned reverse side up and the rule placed across or the cutting pattern template or the like for guidance of the needle 15, and the underside of the slab of mica or plastic would be scribed with the scribing needle 15 and thereafter for mica having been scribed in this manner, the operator would thereafter place his thumb in the vicinity of the cut and press downwardly while with the other hand the operator snaps upwardly on the portion of the mica being removed beyond (next to the operator) the line of scribing. In cutting the mica by the drawn action of the cutting needle 15, the drawn action in a parallel direction to the rule is continued with a downward pressure until the needle has cut about one-half through the mica after which while pressing down with the thumb of one hand the other hand snaps upwardly to remove the cut off portion.

Where such an operation as illustrated in FIG. 3 is with plastic, cutting normally the underside of the plastic, after the cutting operation the portion to be snapped off, is snapped downwardly. The direction of snapping is important in order to obtain a clean smooth edge at the time of the snapping. Following the snapping off of the removed piece of mica or plastic, it is possible to complete the operation by the use of sand paper, a file, or the like to give a clean smooth finish.

Similarly in FIG. 4 in a conventional normal operation, the mica is not pre-scribed in the manner illustrated in FIG. 3 but is placed with the upper face upward and the downward face downward on the table or bench surface in the manner shown in FIG. 4, and the scribing action is begun and continued until after about ten to twelve to and fro motions the needle has penetrated about one-half way through the mica after which a downward pressure on the rearward end of the instrument (cutting tool) snaps off the portion being removed adjacent the scribed line of cut. Similarly in this operation after the snapping action a piece of snad paper or file or the equivalent may be utilized for smoothing-off and/or finishing the surface into a preferred and finished product.

Figure 5:
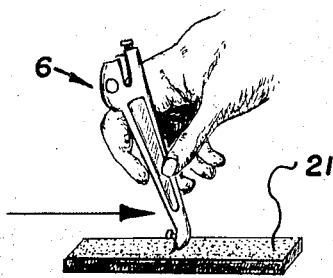
FIG. 5 illustrates the direction of movement and position of the cutter tool of this invention when sharpening the scribing needle at the rear end of the instrument.

FIG. 5 illustrates a typical method of sharpening the needle 15 showing the proper direction of movement for the sharpening thereof across the roughened surface of a file.

Although a particular width, height, and length of the instrument (cutting tool) of this invention is illustrated in preferred embodiments in FIGS. 1 through 5, it is within the spirit and scope of the invention to for example broaden the width of the instrument which in fact would reduce the possibility of the instrument twisting sideways during the to and fro lateral movement, or to increase the size of the handle or the length of the instrument or make some other variation in the size or thickness of the slot, to the extent that such changes and/or alterations and/or substitutions of equivalent parts therefor is apparent to a person of ordinary skill in this particular field of art. Note that pin 10 does not require sharpening, and works best when not sharpened after use.

It is sometimes preferred to scribe with needle 10 before cutting, with needle 15 the plastic on the surface of the table, in order to first get an exact alignment with the edge of the table.

Preferably in an operation such as of FIG. 3, the longitudinal axis of the instrument (handle) is parallel to the ruler when cutting, and the action in that instance would be solely pulled toward the operator.

I claim:

1. A cutter tool for cutting plastic comprising an elongated unitary member including a terminal head having a through-slot extending from an end of the head axially rearwardly along the member for a predetermined distance defining a lower head projection and an upper longer head projection extending axially beyond the end of the lower projection, the upper projection including an aperture extending downwardly therethrough aligned about uprightly and transverse to the slot, and an additional aperture extending from an end of said upper projection, the end aperture extending axially inwardly and intersecting with the upright aperture, the inwardly extending aperture including female threads; a pin of hard composition removably mountable in said upright aperture and extendable through said upright aperture such that a pointed end of the pin is positionable at a predeterminable distance from and aligned with a terminal end of said lower projection, and a male threaded lock screw screwable into said inwardly extending female threaded aperture for a distance such that the male threaded screw is pressable against a side of the pin to lock the pin within the upright aperture, said elongated member including a handle extending axially from said head of the elongated member, narrowing in depth in a direction away from the head, with the handle extending in a plane about parallel to the longitudinal axis of the slot, and the unitary member further including a second terminal head defining a projection extending about downwardly including an about uprightly extending channel in said downwardly extending projection receivable of a pin, and said projection defining also an about rearwardly extending aperture having female threads and intersecting said downwardly extending projection's upright aperture, and including a male threaded screw screwable into said female threaded rearwardly extending aperture sufficiently to be lockable of side pin within said projection's upright aperture.

2. The cutter tool of claim 1, in which said lower projection includes an abutting end aligned with said upright aperture, and said lower projection extends downwardly from said slot for a thickness greater than the thickness of said upper projection, where said thicknesses are transverse to said slot and in about the same plane as said upright aperture.

3. The cutter tool of claim 2, in which said upper projection is substantially tuboid in shape and in which said elongated members depth is substantially greater than the elongated members' width.

4. The cutter tool of claim 2, in which said downwardly extending projection is gradually curved angularly downwardly such that said projections about upright aperture is mountable of a needle in a position extending downwardly and slightly rearwardly on a perpendicular to said elongated member's length.

5. The cutter tool of claim 1, including said elongated unitary member defining a through-hole extending from side to side of said elongated member in a plane parallel with said slot extending through said head, said hole being located beneath said slot in said lower projection.

6. A process comprising placing a slab of plastic on an object having a substantially flat upper surface and a substantially squared off edge in its thickness, adjusting the slab to overhang the squared off edge such that an edge of the slab overhangs the squared off edge of the object a predetermined distance, and employing a cutting tool to scribe an upper surface of said slab along a line aligned with said squared off end of said object and to snap off an overhanging edge of said slab extending beyond said scribed portion, said employing comprising utilizing a cutter tool comprising an elongated unitary member including a terminal head having a through-slot extending from an end of the head axially rearwardly along the member for a predetermined distance defining a lower head projection and an upper longer head projection extending axially beyond the end of the lower projection, the upper projection including an aperture extending downwardly therethrough aligned about uprightly and transverse to the slot, and an additional aperture extending from an end of said upper projection, the end aperture extending axially inwardly and intersecting with the upright slot, the inwardly extending aperture including female threads; a pin of hard composition removably mountable in said upright aperture and extendable through said upright aperture such that a pointed end of the pin is positionable at a predeterminable distance from and aligned with a terminal end of said lower projection, and a male threaded lock screw screwable into said inwardly extending female threaded aperture for a distance such that the male threaded screw is pressable against a side of the pin to lock the pin within the upright aperture, said employing to scribe including slipping said overhanging portion into said slot with said lower projection's abutting end pressed against the squared off edge of said object and concurrently moving said cutting tool laterally with simultaneously a downward pressure exerted on said cutting tool such as to cause said needle to scribe the upper surface of said slab, and thereafter pressing downwardly on said handle at a point removed from said head sufficiently to snap off said scribed overhanging slab.

* * * * *